United States Patent [19]

Jacobson et al.

[11] 4,144,384
[45] Mar. 13, 1979

[54] CELLS HAVING CATHODES WITH VANADIUM-CHALCOGEN-CONTAINING COMPOUNDS

[75] Inventors: Allan J. Jacobson, Princeton; Russell R. Chianelli, Somerville; M. Stanley Whittingham, Fanwood, all of N.J.

[73] Assignee: Exxon Research & Engineering Co., Florham Park, N.J.

[21] Appl. No.: 921,256

[22] Filed: Jul. 3, 1978

[51] Int. Cl.$^2$ .............................................. H01M 4/58
[52] U.S. Cl. .................................................. 429/218
[58] Field of Search ............... 429/218, 112, 103, 104, 429/191, 194

[56] References Cited

U.S. PATENT DOCUMENTS

| | | | |
|---|---|---|---|
| 3,864,167 | 2/1975 | Broadhead et al. | 429/218 X |
| 3,925,098 | 12/1975 | Saunders et al. | 429/218 X |
| 4,009,052 | 2/1977 | Whittingham | 420/218 X |

*Primary Examiner*—Charles F. LeFevour
*Attorney, Agent, or Firm*—Kenneth P. Glynn

[57] ABSTRACT

The present invention is directed to an electric current-producing cell which contains:
a cathode having as its cathode-active material one or more vanadium compounds selected from:
(i) those having the formula:

$$V_a Z_b \qquad (1)$$

wherein Z is a chalcogen selected from the group consisting of sulfur, selenium, and sulfur-selenium mixtures, wherein a is a numerical value of about 2, and wherein b is a numerical value of bout 4.5 to about 7;
(ii) those having the formula:

$$(NA_4)_x V Z_y \qquad (2)$$

wherein Z is a chalcogen selected from the group consisting of sulfur, selenium, and sulfur-selenium mixtures, wherein x is a numerical value of about 2 to about 4, and wherein y is a numerical value of about 3 to about 5; and,
(iii) those having the formula:

$$H_m(NH_4)_n V Z_y \qquad (3)$$

wherein Z is a chalcogen selected from the group consisting of sulfur, selenium, and sulfur-selenium mixtures, wherein m is a numerical value of about 1 to about 3 and n is a numerical value of about 1 to about 3, subject to the proviso that the sum of m and n is numerical value of about 2 to about 4, and wherein y is a numerical value of about 3 to about 5. A preferred cathode-electrode material is $V_a Z_b$ wherein Z is sulfur, a is about 2, and b is about 4.5 to about 5.5. Desirably, this preferred material is obtained from the thermal or chemical decomposition of ammonium thiovanadate $(NH_4)_3 VS_4$.

34 Claims, No Drawings

CELLS HAVING CATHODES WITH VANADIUM-CHALCOGEN-CONTAINING COMPOUNDS

BACKGROUND OF THE INVENTION

1. Field of The Invention

The present invention relates to electric current-producing cells, and more particularly to such cells employing specified cathode-active materials of vanadium-chalcogen-containing compounds.

2. Description of the Prior Art

There has been considerable interest in recent years in developing high energy density batteries for voltaic cells. Exemplary of the developing systems is a high energy density electrochemical cell utilizing intercalation compounds of the transition metal chalcogenides, including vanadium dichalcogenides, as cathode-active materials and using alkali metal anodes, as set forth in U.S. Pat. No. 4,009,052. Cell data for $VS_2$ and $V_xFe_{1-x}S_2$ ($x \leq 0.5$) cathodes showing less than or about one lithium per unit cathode material reversible capacity has recently been reported by Murphy et al. (*Material Research Bulletin*, Vol. 12, p. 825 et seq. (1977)) and by DiSalvo et al. (*Bull. Am. Phys. Soc.*, Vol. 23, p. 244 et seq. (1978)). Also, the mineral patronite, $VS_4$, has been investigated and found to have a capacity for less than one lithium and found to be irreversible by Murphy and Trumbore (*Journal Crystal Growth*, Vol. 39, p. 196 (1977)). U.S. Pat. No. 3,655,585 describes a cell utilizing as a cathode-active material vanadium pentoxide prepared by the thermal decomposition of ammonium vanadate.

The compounds utilized as the cathode-active materials in the cells of the present invention are vanadium-chalcogen-containing type compounds which show a surprisingly high capacity for lithium and are generally rechargeable. Further, notwithstanding the considerable variety of high energy density electrochemical cell systems which have recently been developed, it is believed that the particular cells of the present invention containing the vanadium-chalcogen-containing compounds have not been heretofore disclosed or rendered obvious.

SUMMARY OF THE INVENTION

The present invention is directed to an electric current-producing cell which contains:

(a) an anode having as its anode-active material one or more metals selected from the group consisting of the Periodic Table Group IA metals, Group IB metals, Group IIA metals and Group IIB metals;

(b) a cathode having as its cathode-active material one or more vanadium compounds selected from:

(i) those having the formula:

 (1)

wherein z is a chalcogen selected from the group consisting of sulfur, selenium, and sulfur-selenium mixtures, wherein a is a numerical value of about 2, and wherein b is a numerical value of about 4.5 to about 7;

(ii) those having the formula:

 (2)

wherein Z is a chalcogen selected from the group consisting of sulfur, selenium, and sulfur-selenium mixtures, wherein x is a numerical value of about 3 to about 4 and y is a numerical value of about 3 to about 5; and, (iii) those having the formula:

$H_m(NH_4)_n VZ_y$ (3)

wherein Z is a chalcogen selected from the group consisting of sulfur, selenium, and sulfur-selenium mixtures, wherein m is a numerical value of about 1 to about 3 and n is a numerical value of about 1 to about 3, subject to the proviso that the sum of m and n is a numerical value of about 2 to about 4, and wherein y is a numerical value of about 3 to about 5; and (c) an electrolyte which is chemically inert with respect to said anode and said cathode and which permits the migration of ions between said anode and said cathode.

DETAILED DESCRIPTION OF THE INVENTION

As mentioned, the electric current-producing cell of the present invention is one which contains a specified anode, a functional electrolyte, and a cathode having as its cathode-active material specific compounds containing vanadium and chalcogen moieties.

In general, the anode employed in the cell of the present invention is one which contains as its anode-active material one or more metals selected from the group consisting of the Periodic Table Group IA metals, Group IB metals, Group IIA metals and Group IIB metals. Of these, the Group IA metals, also known as the alkali metals, are desirable. Preferred is the anode having as its anode-active material a metal selected from the group consisting of lithium and sodium, and most preferably lithium. The anode-active material may be in contact with other metal structures in the cell of the present invention, depending upon the particular anode-active material being used. Thus, for example, some anode-active materials are self-supporting and may also serve as current collectors whereas other anode-active materials, e.g., lithium, may be in contact with other metal structures, such as nickel, copper or silver screen, which serve as current collectors. These anode configurations are a matter of design depending upon the particular anode-active material being used and are well known in the art.

The cathode employed in the cell of the present invention is one which contains as its cathode-active material one or more compounds selected from the group consisting of:

(i) those having the formula:

 (1)

wherein Z is a chalcogen selected from the group consisting of sulfur, selenium, and sulfur-selenium mixtures, wherein a is a numerical value of about 2, and wherein b is a numerical value of about 4.5 to about 7;

(ii) those having the formula:

 (2)

wherein Z is a chalcogen selected from the group consisting of sulfur, selenium, and sulfur-selenium mixtures, wherein x is a numerical value of about 2 to about 3, and wherein y is a numerical value of about 3 to about 5; and, (iii) those having the formula:

$$H_m(NH_4)_n VZ_y \qquad (3)$$

wherein Z is a chalcogen selected from the group consisting of sulfur, selenium, and sulfur-selenium mixtures, wherein m is a numerical value of about 1 to about 3 and n is a numerical value of about 1 to about 3, subject to the proviso that the sum of m and n is a numerical value of about 2 to about 4, and wherein y is a numerical value of about 3 to about 5.

The variable Z as defined in all three formulas above represents a chalcogen selected from the group consisting of sulfur, selenium, and sulfur-selenium mixtures. Desirably, Z is selected from the group consisting of sulfur and selenium. Preferably, the chalcogen Z is sulfur.

The variable b in formula (1) is defined as a numerical value of about 4.5 to about 7. Preferably, b is a numerical value of about 4.5 to 5.5.

The variables m and n in formula (3) are defined as numerical values of about 1 to about 3, subject of the proviso that the sum of m plus n is a numerical value of about 2 to about 4. Preferably, m is about 1 and n is about 2, e.g. $H(NH_4)_2VS_4$ would be a resulting cathode-active material.

Of all the compounds used as cathode-active materials in the cells of the present invention, and the mentioned formula (1) compounds are preferred, and of these, the compounds wherein Z is sulfur, a is about 2 and b is about 4.5 to about 5.5, e.g., $V_2S_5$, are most preferred.

Among the many cathode-active materials which are used in the cells of the present invention are:
$V_2S_5$
$V_2Se_{4.5}$
$(NH_4)_3VSe_4$
$(NH_4)_3VS_4$
$(NH_4)_3VS_3S$
$H(NH_4)_2VS_4$
and the like. It should now be obvious to the artisan that various homolog and analog compounds of the foregoing are intended to be included herein commensurate with the scope of the above formulas.

The above-mentioned cathode-active compounds may be prepared by known techniques and are believed to be within the purview of the artisan. For example, the compounds of formulas (2) and (3) above such as ammonium thiovanadate or hydrogen ammonium thiovanadate may be formed by passing sulfurous vapors through a solution of ammonium vanadate or hydroben ammonium vanadate, respectively. The compounds of formula (1) above may be prepared by the decomposition of the formula (2) and formula (3) compounds under certain conditions. For example, decomposition products of ammonium thiovanadate (or hydrogen ammonium vanadate). The decomposition may be carried out at temperatures below about 350° C. and this may be done either by thermal decomposition or chemical decomposition. Thus, heating ammonium thiovanadate at temperatures about 50° or so and up to as high as 350° will effect, at least to some degree, the thermal decomposition of the compound to yield formula (1) type compound. (See, for example, T. P. Prasad et al., *Journal of Thermal Analysis*, Vol. 10, p. 369 et seq. (1976) and A. Buisine et al., *Comptes Rendus*, Vol. 251, p. 2720 et seq. (1960) wherein the formation of $V_2S_5$ from $(NH_4)_3VS_4$ is described.) In general, these decomposition products obtained below about 350° C have surprisingly been found to effect significantly higher energy density electrochemical cells than the vanadium sulfides obtained by thermal decomposition above 350° C. or as described in the prior art.

The cathode-active materials of the compounds described above which have been decomposed, at least in part, by thermal activity, may be characterized as generally amorphous in nature, with no sharp reflections being apparent in X-ray diffractometer studies.

Advantageously, the cathode-active compounds of the present invention cells may simply be hot pressed into a cathode structure (wherein at least partial thermal decomposition is inherent), although the thermal decompositions described may be employed prior to cathode construction. The cathode-active material may be supported on structures such as carbon, copper, nickel, stainless steel, iron, etc., and it may be supported on such materials or it may be impregnated into such materials. Advantageously, the cathode does not contain any conductive diluents within the cathode-active material, such as carbon. However, plastic binding agents such as polyfluoroethylene may be utilized if desired.

The electrolyte used in the cell of the present invention is any electrolyte which is chemicaly inert with respect to the anode and with respect to the cathode, and which permits the migration of ions between the anode and the cathode. In general, the choice of electrolyte depends upon the anode-active material being used in the cell. Thus, where the anode-active material is a Group IA metal, the electrolyte will most likely be nonaqueous. However, where the anode-active material is one which is selected, for example, from the Group IIB metals, an aqueous electrolyte may be employed. When the preferred anode-active material selected from the Group IA metals is used in a cell in the present invention, the electrolyte may typically be a nonaqueous alkali metal salt-organic solvent electrolyte solution. These alkali metals salts are well known in the art and need not be enumerated herein. However, such salts include the lithium and sodium salt complexes which are dissolved in organic solvents such as the inertly substituted and unsubstituted ethers, sulfones, organic sulfates, organic sulfites, organic nitrites and organic nitro compounds. One preferred electrolyte for use in conjunction well cells containing lithium as its anode-active material is an electrolyte containing lithium perchlorage salt dissolved in dioxolane or a dioxolane-containing solution. One preferred electrolyte in cells containing sodium as its anode-active material contains sodium triethyl pyrrole boron dissolved in a cyclic ether-containing solution. Alternatively, solid electrolytes, such as the beta aluminas or halides, or molten salts, may be used.

The electric current-producing cells of the present invention containing the above-mentioned anode, cathodes and electrolytes not only have high energy densities, but are also capable of being cycled through charging and discharging, and may be readily produced on a large-scale basis.

The present invention is illustrated by the following examples, but the invention should not be construed by being limited thereto.

EXAMPLE 1

Ammonium thiovanadate was precipitated from an aqueous solution of sodium pyrovanadate ($Na_4V_2O_7$) and ammonium sulfide by bubbling hydrogen sulfide through it. This precipitate was filtered under nitrogen and washed with a small amount of ethanol.

EXAMPLE 2

Ammonium thiovanadate prepared as in Example 1 was heated (in argon) at 10° C/min up to 600° C on a thermogravimetric analyzer. 44.5% of its initial weight was lost below 220° C and a further 13.8% of its initial weight was lost beginning at about 350° C. The final product was shown to be crystalline by X-ray analysis.

EXAMPLE 3

Samples of ammonium thiovanadate prepared as in Example 1 were reacted with n-butyl lithium, sodium naphthalide and potassium naphthalide. About 2.2 moles of n-butyl lithium, 5.1 moles of sodium naphthalide and 5.2 moles of potassium naphthalide were consumed per mole of $(NH_4)_3VS_4$. This high reactivity for alkali metals shows the utility of the compound as an active cathode material.

EXAMPLE 4

Ammonium thiovanadate prepared as in Example 1 was thermally decomposed in a helium gas stream at 250° C. (below the second weight loss). The product was shown by X-ray diffraction to be amorphous. This material was reacted with n-butyl lithium, sodium naphthalide and potassium naphthalide. About 22 milliequivalents/gm of butyl lithium, 24 milliequivalents/gm of sodium naphthalide, and 19 milliequivalents/gm of potassium naphthalide were consumed. This high reactivity for alkali metals shows the utility of these vanadium sulfur compositions as active cathode materials.

EXAMPLE 5

Ammonium thiovanadate prepared as described in Example 1 was mixed with 10 wt. % polyfluoroethylene powder and pressed into an expanded stainless steel grid first at room temperature and then at about 300° C. The grid had about 2 cm² of active cathode material. A cell was then prepared by surrounding the cathode screen with polypropylene separators and then pure lithium metal which served as the anode. This assembly was then immersed in a 2 molar solution of lithuium perchlorate in dioxolane. The cell was then discharged at 1 ma to a cut-off of 1.40 volts. The capacity on the first discharge was 1.48 kilocoulombs/gm of cathode material. The cell was then repetitively cycled more than twenty times between 1.40 and 2.80 volts at 1 ma discharge current and 0.5 ma charge current showing its high reversibility.

EXAMPLE 6

A cell was constructed and tested as in Example 5 except that the discharge current was 5 ma. The initial capacity was 1.31 kilocoulombs/gm of cathode material. The cell was recharged to 2.80 volts of 0.5 ma and then repetitively cycled more than twenty times between 1.40 and 2.80 volts showing its high reversibility at the 5 ma discharge rate.

EXAMPLE 7

A cell was constructed as in Example 5. This cell was discharged at currents of 20 ma, 10 ma, 4 ma, 2 ma and 1 ma successively to a lower cut off voltage of 1.40 volts, with 30 min rests under open circuit conditions between each discharge. The coulombic capacity for each discharge was measured and was respectively 1.18 kilocoulombs/gm of cathode material (20 ma), 0.21 kilocoulombs/gm (10 ma), 0.08 kilocoulombs/gm (4 ma), 0.04 kilocoulombs/gm (2 ma) and 0.03 kilocoulombs/gm (1 ma). The total capacity on discharge was 1.54 kilocoulombs/gm and 76.6% of this capacity was obtained at 20 ma.

EXAMPLE 8

A cell was constructed as in Example 5 except that the electrolyte was a 1.6 molar solution of sodium triethyl pyrrole boron in dioxolane and the anode was sodium pressed into an expanded stainless steel screen. The initial open circuit voltage was 2.13 volts and the cell was discharged at 1 ma to a capacity of 0.44 kilocoulums/gm of cathode material.

What is claimed is:

1. An electric current-producing cell, comprising:
  (a) an anode having as its anode-active material one or more metals selected from the group consisting of the Periodic Table Group IA metals, Group IB metals, Group IIA metals and Group IIB metals;
  (b) a cathode having as its cathode-active material one or more compounds selected from the group consisting of:
  (i) those having the formula:

$$V_a Z_b \qquad (1)$$

wherein Z is a chalcogen selected from the group consisting of sulfur, selenium, and sulfur-selenium mixtures, wherein a is a numerical value of about 2, and wherein b is a numerical value of about 4.5 to about 7;
  (ii) those having the formula:

$$(NH_4)_x VZ_y \qquad (2)$$

wherein Z is a chalcogen selected from the group consisting of sulfur, selenium, sulfur-selenium mixtures, wherein x is a numerical value of about 2 to about 4, and wherein y is a numerical value of about 3 to about 5; and;
  (iii) those having the formula:

$$H_m (NH_4)_n VZ_y \qquad (3)$$

wherein Z is a chalcogen selected from the group consisting of sulfur, selenium, and sulfur-selenium mixtures, wherein m is a numerical value of about 1 to about 3 and n is a numerical value of about 1 to about 3, subject to the proviso that the sum of m and n is a numerical value of about 2 to about 4, and wherein y is a numerical value of about 3 to about 5; and,
  (c) an electrolyte which is chemically inert with respect to said anode and said cathode and which permits the migration of ions between said anode and said cathode.

2. The cell of claim 1 wherein Z in all of the compound formulas is a chalcogen selected from the group consisting of sulfur and selenium.

3. The cell of claim 2 wherein said chalcogen Z is sulfur.

4. The cell of claim 1 wherein said anode has as its anode-active material one or more metals selected from the Group IA metals.

5. The cell of claim 4 wherein the anode-active material is selected from the group consisting of lithium and sodium and wherein Z in all of the compound formulas is a chalcogen selected from the group consisting of sulfur and selenium.

6. The cell of claim 5 wherein said chalcogen Z is sulfur.

7. The cell of claim 1 wherein said anode has lithium as its anode-active material.

8. The cell of claim 7 wherein Z in all of the compound formulas is a chalcogen selected from the group consisting of sulfur and selenium.

9. The cell of claim 8 wherein said chalcogen Z is sulfur.

10. The cell of claim 1 wherein said cathode has as its cathode-active material one or more compounds selected from the group consisting of the compounds of formula (1).

11. The cell of claim 10 wherein Z is a chalcogen selected from the group consisting of sulfur and selenium.

12. The cell of claim 11 wherein said chalcogen Z is sulfur.

13. The cell of claim 12 wherein b is a numerical value of about 4.5 to about 5.5.

14. The cell of claim 10 wherein said anode has as its anode-active material one or more metals selected from the Group IA metals.

15. The cell of claim 14 wherein the anode-active material is selected from the group consisting of lithium and sodium and wherein Z is a chalcogen selected from the group consisting of sulfur and selenium.

16. The cell of claim 15 wherein said chalcogen Z is sulfur.

17. The cell of claim 16 wherein b is a numerical value of about 4.5 to about 5.5.

18. The cell of claim 10 wherein said anode has lithium as its anode-active material.

19. The cell of claim 18 wherein Z is a chalcogen selected from the group consisting of sulfur and selenium.

20. The cell of claim 19 wherein said chalcogen Z is sulfur.

21. The cell of claim 20 wherein b is a numerical value of about 4.5 to about 5.5.

22. The cell of claim 10 wherein said compound is obtained by decomposition of compounds selected from the group consisting of:
(a) those of formula (ii); and,
(b) those of formula (iii).

23. The cell of claim 22 wherein Z in all of the compound formulas is a chalcogen selected from the group consisting of sulfur and selenium.

24. The cell of claim 23 wherein said chalcogen Z is sulfur.

25. The cell of claim 24 wherein b is a numerical value of about 4.5 to about 5.5.

26. The cell of claim 22 wherein said anode has as its anode-active material one or more metals selected from the Group IA metals.

27. The cell of claim 26 wherein the anode-active material is selected from the group consisting of lithium and sodium and wherein Z in all of the compound formulas is a chalcogen selected from the group consisting of sulfur and selenium.

28. The cell of claim 27 wherein said chalcogen Z is sulfur.

29. The cell of claim 28 wherein b is a numerical value of about 4.5 to about 5.5.

30. The cell of claim 22 wherein said anode has lithium as its anode-active material.

31. The cell of claim 30 wherein Z in all of the the compound formulas is a chalcogen selected from the group consisting of sulfur and selenium.

32. The cell of claim 31 wherein said chalcogen Z is sulfur.

33. The cell of claim 32 wherein b is a numerical value of about 4.5 to about 5.5.

34. The cell of claim 10 wherein Z is sulfur, b is a numerical value of about 4.5 to about 5.5, and wherein said compound is obtained by the thermal decomposition of $(NH_4)_3VS_4$ below about 350° C.

* * * * *